(12) United States Patent
Arthurs (10) Patent No.: US 6,591,261 B1
(45) Date of Patent: Jul. 8, 2003

(54) NETWORK SEARCH ENGINE AND NAVIGATION TOOL AND METHOD OF DETERMINING SEARCH RESULTS IN ACCORDANCE WITH SEARCH CRITERIA AND/OR ASSOCIATED SITES

(75) Inventor: Keith E. Arthurs, Germantown, MD (US)

(73) Assignee: Zerx, LLC, Germantown, MD (US)

( * ) Notice: Subject to any disclaimer, the term of this patent is extended or adjusted under 35 U.S.C. 154(b) by 354 days.

(21) Appl. No.: 09/598,517

(22) Filed: Jun. 21, 2000

Related U.S. Application Data (60) Provisional application No. 60/139,796, filed on Jun. 21, 1999.

(51) Int. Cl.[7] .............................................. G06F 17/30
(52) U.S. Cl. ................................. 707/2; 707/3; 707/10
(58) Field of Search .......................... 707/10, 3, 4, 2; 705/35; 455/305

(56) References Cited

U.S. PATENT DOCUMENTS

| | | | |
|---|---|---|---|
| 5,754,939 A | * | 5/1998 | Herz et al. ............... 455/3.04 |
| 5,933,822 A | * | 8/1999 | Braden-Harder et al. ...... 707/3 |
| 6,169,986 B1 | * | 1/2001 | Bowman et al. .............. 707/10 |
| 6,236,987 B1 | * | 5/2001 | Horowitz et al. ............. 705/35 |
| 6,363,377 B1 | * | 3/2002 | Kravets et al. ................ 707/4 |

* cited by examiner

Primary Examiner—Safet Metjahic
Assistant Examiner—CamLinh Nguyen (57) ABSTRACT

The search engine of the present invention combines the rated index of the content of a web site with the correlation of links to other sites to provide a logical grouping of related sites and enhanced search engine ranking capability. Further, the search engine enhances the results by indicating the closest groupings to the desired topic and iteratively refining the search results. Moreover, the search engine may be utilized to search through any types of data or information having links, pointers or other indicators to other data related in any fashion. For example, the present invention may be utilized to search through data containing documents listing or citing other related documents by specific identification (e.g., case law, patents, various newspaper or other articles, etc.), whereby a search query may result in finding initial documents satisfying the query and other documents related to those initial documents.

38 Claims, 9 Drawing Sheets

NETWORK SEARCH ENGINE AND NAVIGATION TOOL AND METHOD OF DETERMINING SEARCH RESULTS IN ACCORDANCE WITH SEARCH CRITERIA AND/OR ASSOCIATED SITES

CROSS-REFERENCE TO RELATED APPLICATIONS

This application claims priority from U.S. Provisional Patent Application Ser. No. 60/139,796, entitled "Internet Search Engine and Web Navigation Tool" and filed Jun. 21, 1999. The disclosure of that provisional application is incorporated herein by reference in its entirety.

BACKGROUND OF THE INVENTION

1. Technical Field

The present invention pertains to computer systems for navigating a network and searching for information stored within systems residing thereon. In particular, the present invention pertains to a search engine and navigation tool for a network, such as the Internet, that provides search results in accordance with search criteria and/or associated sites.

2. Discussion of Related Art

Current internet search engines have developed various techniques for ranking web sites as to their relevance to a search, usually on the basis of the location and frequency of search terms residing in the site and web site popularity as determined by the quantity of links to a web site. This technique is not necessarily conducive to finding web sites that are closely related to the search terms since wording within the web sites may not be judged properly by a search engine that rates web site relevance by frequency criteria and link quantity.

OBJECTS AND SUMMARY OF THIS INVENTION

Accordingly, it is an object of the present invention to provide network search results in accordance with search criteria and/or sites associated with the search results.

It is another object of the present invention to determine relevancy of network search results based on associations with search result sites.

Yet another object of the present invention is to refine network search results based on associations with user selected sites.

Still another object of the present invention is to combine network search results based on content and/or associations with user selected sites to provide refined search results having enhanced relevancy to a particular topic.

The aforesaid objects are achieved individually and/or in combination, and it is not intended that the present invention be construed as requiring two or more of the objects to be combined unless expressly required by the claims attached hereto.

According to the present invention, an enhanced ranking may be made of the logical grouping of a multitude of network or web sites by correlating the links available on web pages. The correlation of these links can be determined from the number of times two or more of the sites are linked from common web pages. In other words, if two specific web sites are each listed as links by a third-party site, the two sites are somewhat likely to have a common theme, even if they do not directly link to one another. If numerous third-party sites link to both of the two specific sites, the probability of the two specific sites being related becomes greater. For example, even if web pages of two car manufacturers do not link to one another, numerous web pages do link to both manufacturers since the topics on both car manufacturer pages are closely related. In addition, search results may include numerous web sites that are related to each other based upon link analysis. Web sites that have strong relationships and match a search query are more likely to be related to the search than web sites that have few or no related sites within the search results. The relationships and corresponding strengths are used to determine rankings for listing the sites in order of relevancy with the most relevant sites being listed ahead of the lesser relevant sites.

Upon "spidering" the Web (e.g., traversing substantially the entire Web by following links between web pages), groupings of web sites can be determined by setting threshold values for sites that are linked by common web sites. The greater the quantity of common links in a grouping and the closer the proximity of the links to one another, the closer the relationship between the grouping of sites. A statistically accurate assumption can be made as to validity of a grouping of sites by setting threshold values for the quantity of common links. The present invention combines the rated index of the content of a web site with the correlation of links to other sites to provide a logical grouping of related sites and enhanced search engine ranking capability. Further, the present invention enhances the results by indicating the closest groupings to the desired topic and iteratively refining the search results.

The above and still further objects, features and advantages of the present invention will become apparent upon consideration of the following detailed description of specific embodiments thereof, particularly when taken in conjunction with the accompanying drawings, wherein like reference numerals in the various figures are utilized to designate like components.

DETAILED DESCRIPTION OF THE PREFERRED EMBODIMENTS

Figure 1:
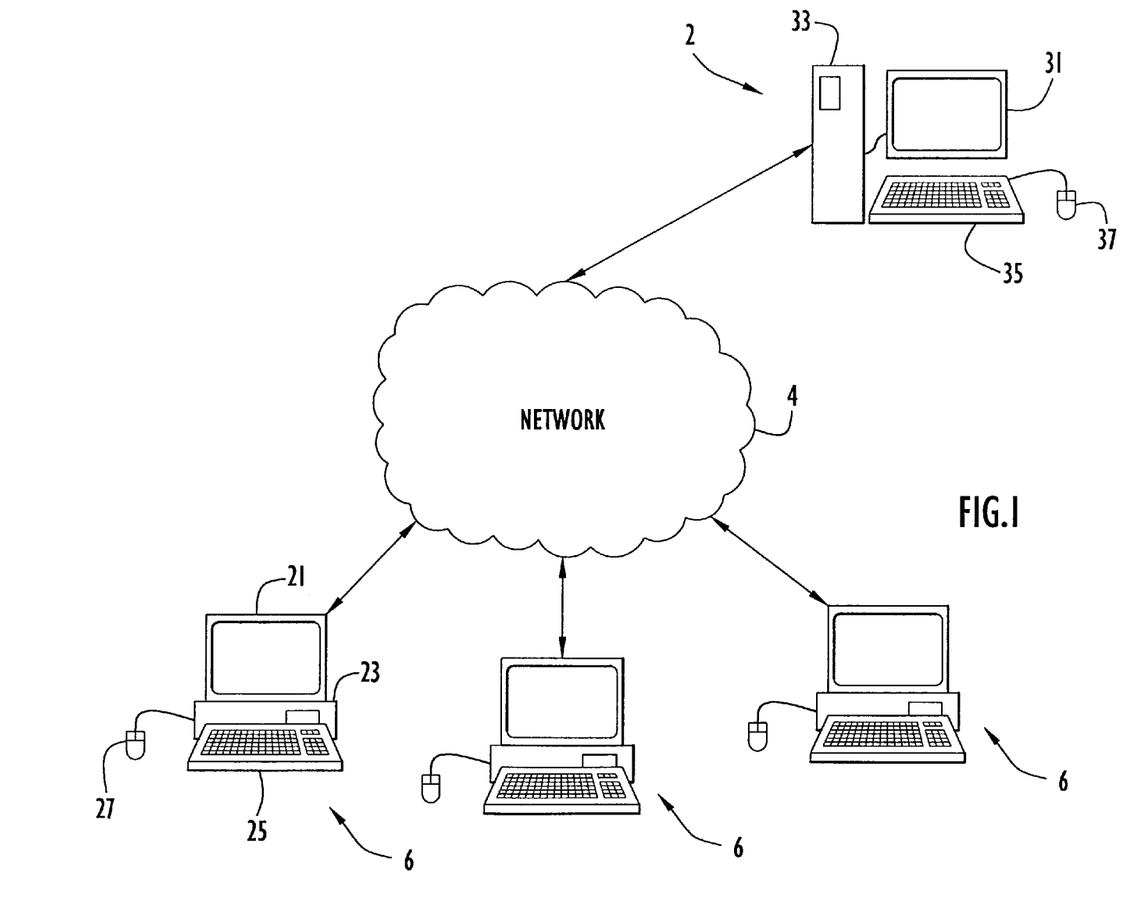
FIG. 1 is a schematic diagram of a server system employing the search engine according to the present invention and accessible by end-users via a communications network.

A system employing the search engine and navigation tool of the present invention is illustrated in FIG. 1. Specifically, the system preferably includes a server computer system 2 in communication with or connected to a network 4, such as the Internet, and end-user computer systems 6 accessing the server via the network. The end-user computer systems are typically implemented by conventional personal or other suitable computer systems preferably equipped with display or monitor 21, a base 23 (i.e., including the processor memories and internal or external communications devices (e.g., modem, network cards, etc.)), a keyboard 25 and optional mouse 27 or other input device. End-user systems 6 each include software (e.g., operating system, Internet browser, etc.) to communicate with server system 2, and appropriate components (e.g., processor, disk storage or hard drive, etc.) having sufficient processing and storage capabilities to effectively execute the software. The end-user systems may utilize any of the major platforms (e.g., Linux, Macintosh, Unix, OS2, Windows, etc.). Similarly, server system 2 is typically implemented by a conventional personal or other suitable computer system preferably equipped with a display or monitor 31, a base 33 (i.e., including the processor, memories and internal or external communication devices (e.g., modem, network cards, etc.)), a keyboard 35 and optional mouse 37 or other input device. The server system includes software (e.g., operating system, server software, search engine software, etc.) to communicate with end-user systems 6 and process search requests, and appropriate components (e.g., processor, disk storage or hard drive, etc.) having sufficient processing and storage capabilities to effectively execute the server and search engine software. The server system may utilize any of the commercially available operating systems and/or server software, and, under software control, implements the search engine of the present invention for processing search requests from the end-user computer systems.

Figure 2:
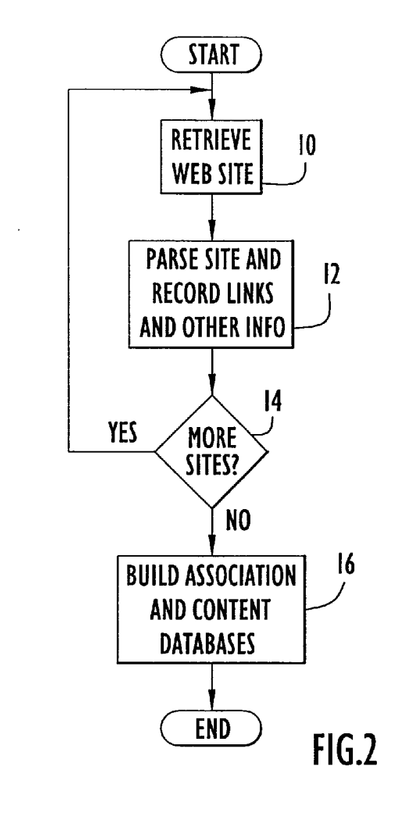
FIG. 2 is a procedural flow chart illustrating the initial processing performed by the search engine according to the present invention.

The search engine initially builds databases to store information for determining search results and relevancy as illustrated in FIG. 2. Specifically, the Web or World Wide Web (WWW) is "spidered" (e.g., traversing substantially the entire Web by following links between web pages) to determine web sites to be rated. There are numerous conventional techniques and parameters by which spidering can be accomplished, and it is to be understood that virtually any manner of traversing numerous web pages across numerous sites on the World Wide Web (WWW) or other network can be utilized by the present invention for the processing discussed below. As web pages are encountered or retrieved during the spidering process at step 10, the code comprising each web page (e.g., HTML code) is parsed at step 12 to record its links and other page information (e.g., words, title, description, etc.). A listing is constructed containing an id (e.g., web page identifier) for, and all the links of, each web page, whereby the links of each web page are associated with the corresponding id. In other words, this is a listing of links with the associated page containing that link, whereby the link and page are uniquely associated. The listing can be sorted by various conventional techniques and there exist numerous ways of using abbreviations or shorthand notation to distinguish web sites and their links. The relationship of links to the parsed pages and the order of the links within a web site are maintained. When sufficient web sites have been traversed as determined at step 14, the recorded information is stored in association and content databases at step 16 for use in determining relevancy as described below.

The association database is used to associate web pages with one another, and is conceptually an N×N matrix, where N is the number of web sites for which associations are determined. The N×N matrix typically includes entries indicating a null relationship (e.g., the value zero) between a majority of sites since the Web includes numerous unrelated sites. However, only those entries that are non-zero are recorded in the association database as described below, thereby excluding the vast majority of zero-relationship entries from computation.

The relationship between any two sites on the Web (e.g., site 'A' and site 'B') may be determined by incrementing a relationship value for the two sites for each third-party site that lists both sites 'A' and 'B'. This incrementing may be a one-for-one increment for each common site. Alternatively, weights may be assigned to the increment based on the distance between links for sites 'A' and 'B' on various web pages. Thus, if links for sites 'A' and 'B' reside adjacent one another on numerous web pages, that closeness has greater weight than the mere existence of links for sites 'A' and 'B' on the same web page. Accordingly, the further apart the links are on a common web page, the lesser the strength of their relationship. Conversely, if numerous web page authors have listed links for sites 'A' and 'B' in close adjacency, the greater the strength of the relationship between the sites. By way of example only, if links for sites 'A' and 'B' are on the same web page, but are not closely listed, their relationship value may be incremented by one. If the links for sites 'A' and 'B' are within a small number of links of one another on a web page (e.g., within three entries on a web page), their relationship value may be incremented by two. If the links for sites 'A' and 'B' are adjacent to one another on the web page, the relationship value may be incremented by ten. The increments used are for illustrative purposes and any suitable increments may be utilized.

Each time a web site listing both sites 'A' and 'B' is encountered during the spidering process, the relationship value of the association of site 'A' to site 'B' is incremented accordingly. For example, four web sites, each listing sites 'A' and 'B', results in a relationship value or association strength between sites 'A' and 'B' of four (e.g., the relationship value is incremented by one for each web site based on the site listings as described above), while four web sites, each listing sites 'A' and 'B' adjacent one another, results in a relationship value or an association strength of forty (e.g., the relationship value is incremented by ten for each web site based on adjacent site listings as described above). The scale used to determine increment values according to proximity may be any mathematical or arbitrary function, whereby proximity has an impact on the association strength.

In addition, the association database may further provide inherited relationships for child pages (e.g., sub-pages) of a web site. Specifically, a web page that is not related to other pages as defined in the association database, may inherit relationships of a parent page. The relationship values for the child page may be equal to or a portion of the relationship values for the parent. In other words, the child relationship value to a site may be expressed as a function of the parent relationship value to that site, generally being between zero and one hundred percent of the parent value. Thus, the relationship value of the child page may be derived from a function that assigns all or part of the parent value to that child page. The child may receive one-hundred percent of the parent value, or as little as zero percent, thereby implying no relationship between parent and child in associations. The function to determine the child value is generally a multiplier (e.g., a percentage), but any algebraic formulation that provides a value no greater than that of the parent (e.g., square root, cube root, logarithmic root, etc.) may be used. The above inheritance scheme may be applied to further sub-pages. For example, a grandchild page may inherit relationships from either the grandparent or parent pages. The derivation functions are generally applied in succession from initial parent or ancestor page to the particular child page to determine the value of the inherited relationships (e.g., if a 90% multiplier is used to determine the value between parent and child, and an 80% multiplier is used to determine the value between child and a grandchild, then a 72% value (e.g., 80% multiplier applied to the 90% multiplier) is used to determine the value between grand-child and grandparent). The child relationship values are utilized in the same fashion as relationship values for the parent pages to determine relevancy and associated sites as described above. The child values are determined and stored in the association database during spidering as described above for parent pages.

Figure 3:
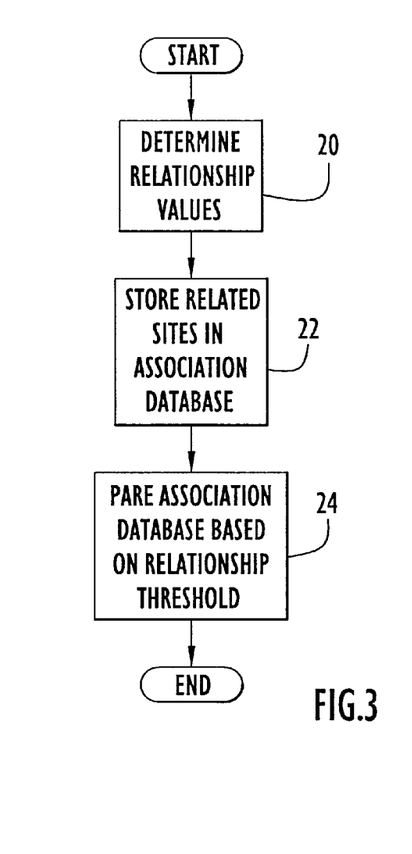
FIG. 3 is a procedural flow chart illustrating the manner in which the search engine builds an association database according to the present invention.

Referring to FIG. 3, upon completion of the spidering process, a relationship value for every existing relationship between two web sites (e.g., including relationships for parent and any children pages) is determined at step 20. The value of the association is based on the number of times the association was detected on various web pages as well as the proximity of links to one another on those pages. For example, with respect to site 'A', a relationship value is determined for each site whose link was listed on any web site that also listed 'A'. Related web sites (e.g., having non-zero relationship values) are stored in the association database at step 22. This database is relatively large, containing an entry for every site that was listed on the same page as another site. Site 'A' may have hundreds or thousands of associations in the database. Less common sites may have a single association, while pages that have no inherited relationships and were never linked to, or linked to from a web page that had no other links, are not listed at all.

The association database is subsequently pared at step 24 based on criteria developed to keep only the significant relationships within the database. If links to sites 'A' and 'C' are only listed on the same page at one other site, their association or relationship value is greater than zero, but probably not of any significant value. Sites 'A' and 'B' may be listed on thousands of pages, resulting in a relationship value in the thousands for that relationship. Thus, the association of 'A' and 'B' is significant, whereas the association between 'A' and 'C' is relatively trivial in comparison. Accordingly, the association database is pared or culled to contain only those associations of sites that are deemed to meet or exceed a particular threshold. The value of the threshold varies depending upon the convention used to determine association or relationship values or, more particularly, upon the number of associations determined for a given site and the overall total number of associations. The association database may preserve associations based on various criteria, such as an association or relationship value exceeding some predetermined threshold, a particular number of associations for each entry or some other technique or combination of techniques. The criteria may be any technique that basically eliminates chance or weak associations to facilitate speed and efficacy.

Figure 4:
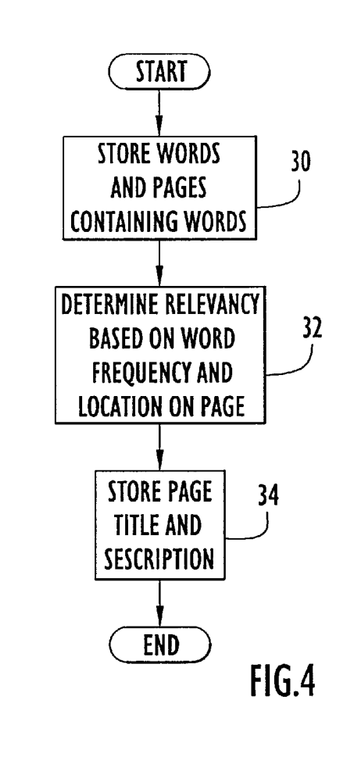
FIG. 4 is a procedural flow chart illustrating the manner in which the search engine builds a content database.

In addition to the association database, a content database is created to store sites' content (as opposed to the association database that is used to determine a site's relationship to other sites) as illustrated in FIG. 4. The content database typically includes information relating to the content of a web page. Specifically, the words residing within the web pages that have been uncovered during the spidering process, and the pages on which those words reside are stored in the database at step 30. Relevance is determined based on the frequency and location that a word resides on a web page, and is subsequently stored in the content database at step 32. The title and description of each web page is further stored in the database at step 34. It is to be understood that the association and content databases may be implemented by any conventional or other databases or storage structures, and may include any type of information.

Figure 5:
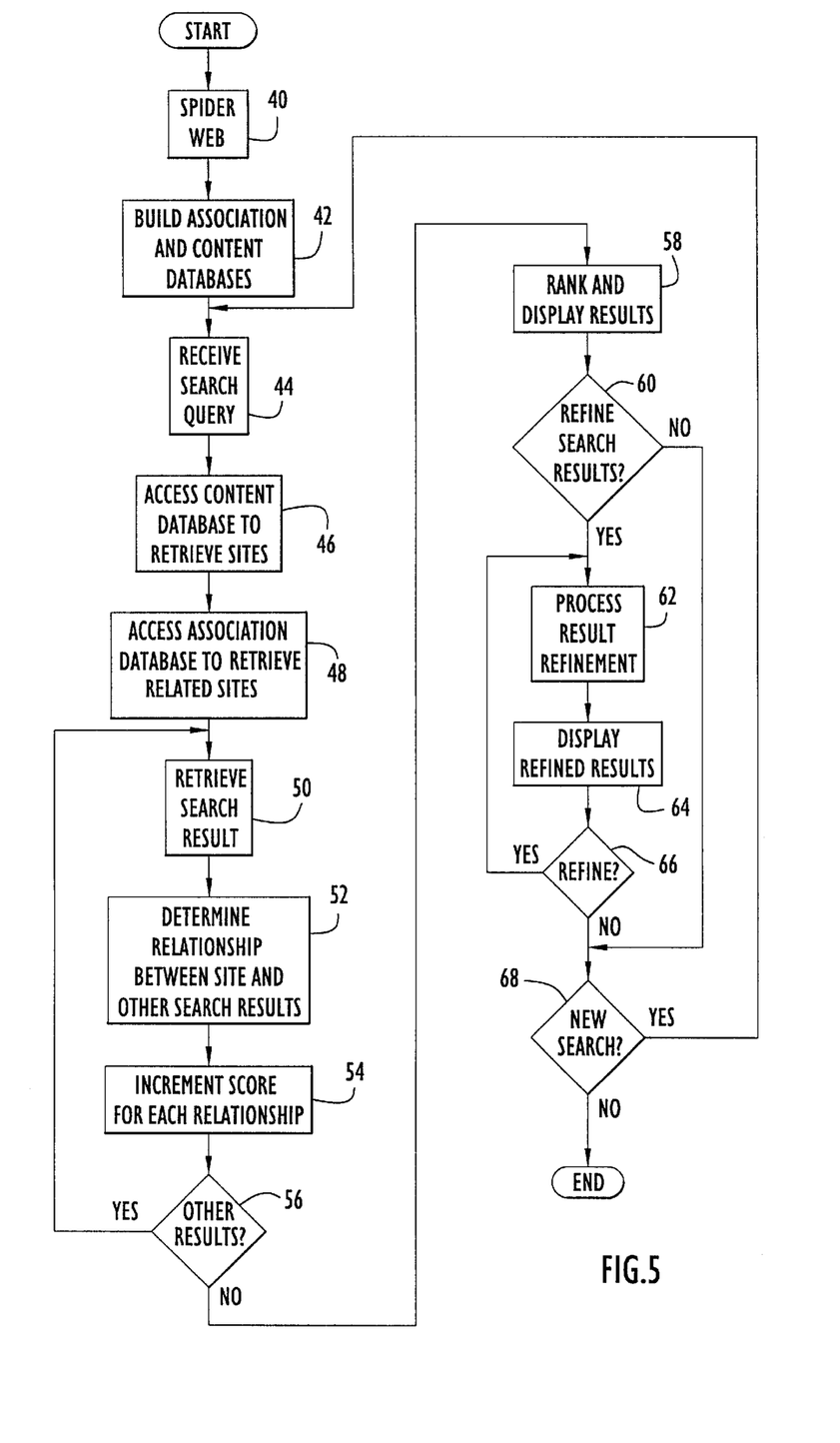
FIG. 5 is a procedural flow chart illustrating the manner in which the search engine processes search requests according to the present invention.

Once the association and content databases are created, the search engine processes search requests and provides results as illustrated, by way of example only, in FIG. 5. Specifically, the server computer system spiders the Web at step 40, and creates the association and content databases as described above at step 42. The Web is spidered at predetermined time intervals (e.g., continuously, hourly, daily, etc.) to continually refresh the association and content databases. An end-user typically visits, via the end-user computer system and corresponding browser, a search engine web site residing on the server computer system to enter a search query at step 44, preferably in the form of a word or phrase. The search engine accesses the content database at step 46 to find sites having a title and description matching the word or phrase. An initial ranking of sites is determined using word or phrase relevance as described above. Once the ranked sites are identified, the association database is accessed at step 48 to find web sites corresponding to the identified sites that are considered to be related because of their frequency of being linked to or from common web pages.

Each web site of the search results (e.g., the web sites identified by the content database) is retrieved at step 50, and relationships between that site and other sites in the search results are determined at step 52 from information stored in the association database. The weight or score for the retrieved web site is adjusted at step 54 based upon the relationship values in the association database for each determined relationship for that site. In other words, each relationship identified for the retrieved site increments the weighting of the score. When each of the search result web sites have been processed as determined at step 56, the search results are ranked in accordance with their score and displayed at the end-user computer system at step 58. The web sites attaining the greatest scores are displayed ahead of the other web sites.

The displayed results may be refined or the search redirected at step 62 in various manners to produce results generally having a greater collective relevance to the search query. In particular, the results of a search are determined as described above and generally displayed with each listed site having links selectively actuable by a user. The links typically include a transference link, a refinement link and an association link. The transference link facilitates transference to the corresponding site. The refinement link enables a user to refine search results based upon other sites associated with the site corresponding to the refinement link. The associated sites are determined from the association database, and sites common to the initial search results and associated sites are displayed with corresponding links as described above. The refined results may be further refined in the manner described above by initiating a refinement link corresponding to a particular displayed site. The further refined results include sites common to all the prior search results and associated with the selected site. Thus, the refinement process may include several iterations or nested levels, with each iteration or level providing results based on prior search results and sites associated with a particular site selected at that level. The association link facilitates retrieval and display of sites associated with the site corresponding to that association link. The associated sites are determined from the association database, and are displayed with corresponding links as described above. These results may be refined in the manner described above by initiating a refinement link associated with a particular displayed site. The associated sites for the selected site are determined from the association database, and sites common to the initial association search results and associated sites for the selected site are displayed with corresponding links as described above. This refinement process may include several iterations or nested levels, with each iteration or level providing results based on prior search results and sites associated with a particular site selected at that level. However, initiation of an association link during the refinement process commences a new top or initial level that determines results based on the site selected at that level (e.g., prior search results are not utilized to determine results in response to initiation of an association link), while subsequent initiation of refinement links utilizes prior search results as described above.

Figure 6:
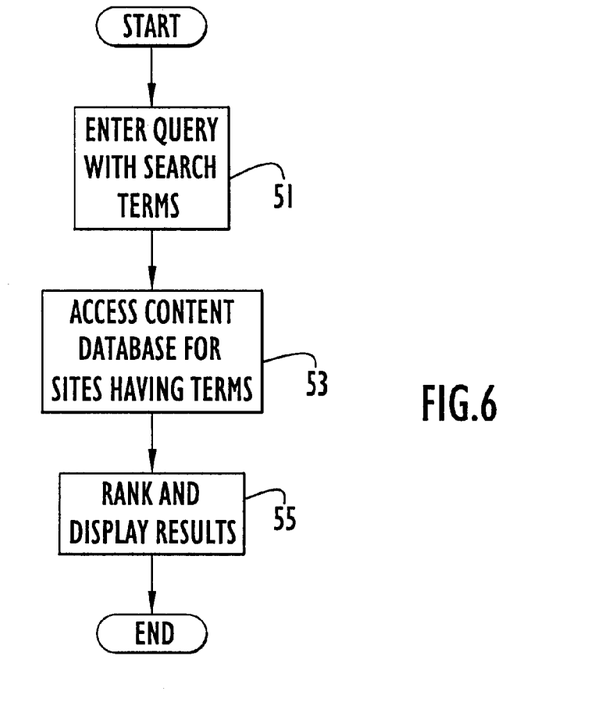
FIG. 6 is a procedural flow chart illustrating the manner in which an initial iteration of search results are determined according to the present invention.
Figure 7:
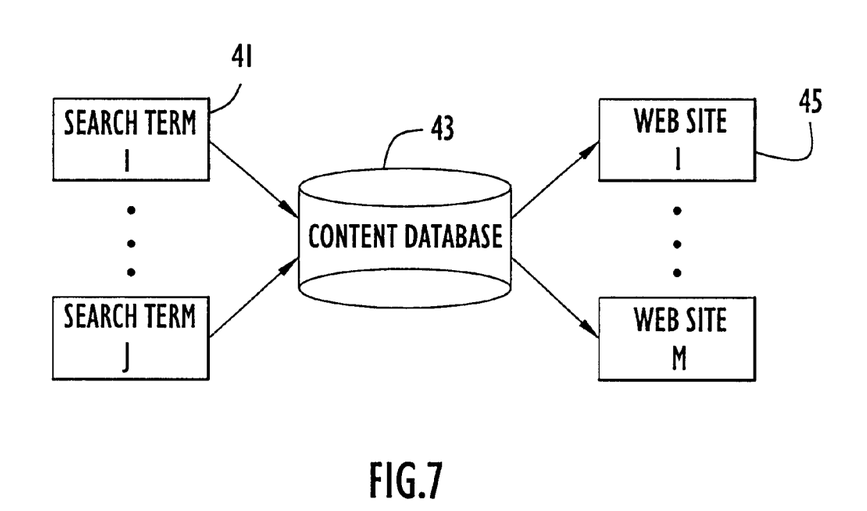
FIG. 7 is a flow diagram illustrating the initial iteration of search results in accordance with the flow chart of FIG. 6.

Exemplary techniques for refining search results or redirecting the search are discussed below. An initial iteration for obtaining search results is illustrated in FIGS. 6–7. This is basically the search and ranking process described above. Specifically, a search argument of terms 41 (e.g., search terms one to J, where J is the number of terms and is generally greater than or equal to one), typically including boolean arguments (e.g., "A" but not "B"), is entered at the end-user computer system at step 51 as described above. The argument is processed by the server system at step 53 by accessing content database 43 to identify web sites 45 (e.g., web sites one to M, where M is the number of identified web sites and is generally greater than or equal to one) containing the search terms or satisfying the search argument. The web sites satisfying the search argument are subsequently ranked based on their associations in the search results as described above and displayed by the end-user computer system at step 55. The refinement and association links enabling the user to direct the search engine to refine the search results or to display associated sites are displayed adjacent each web site as described above.

Figure 8:
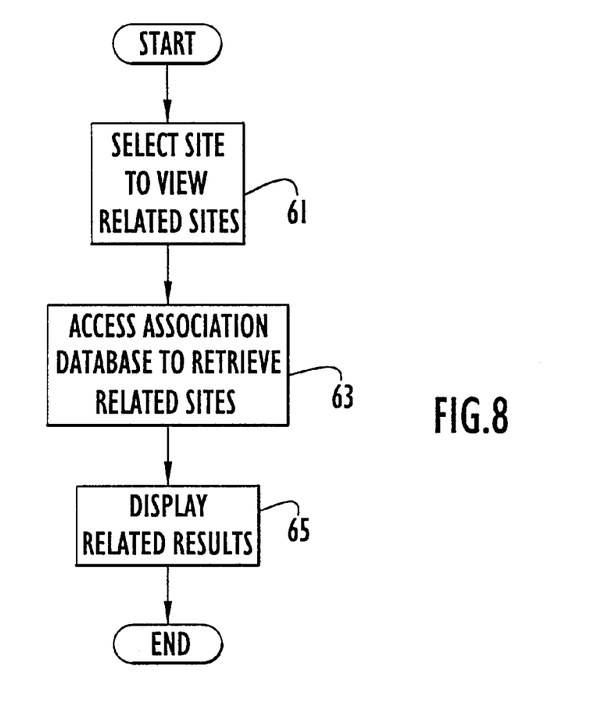
FIG. 8 is a procedural flow chart illustrating manner in which sites associated with the search results may be determined according to the present invention.
Figure 9:
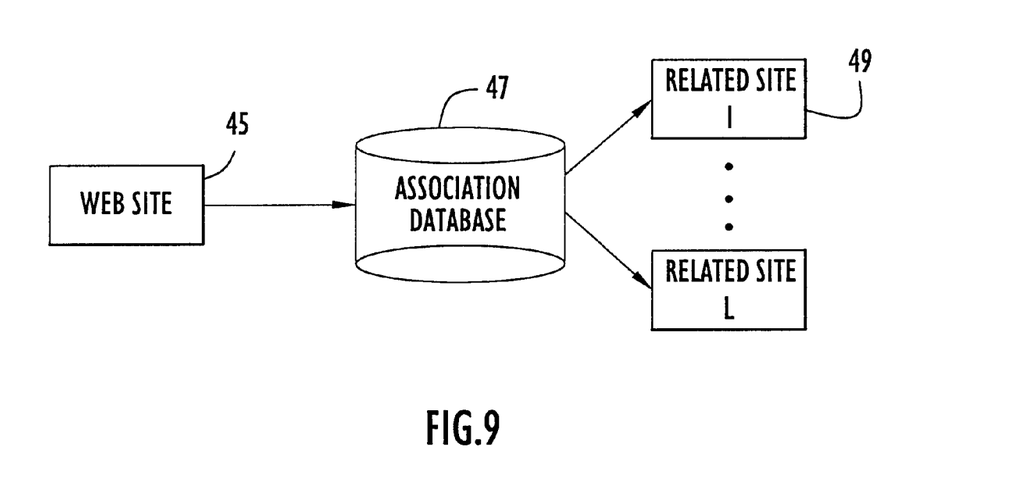
FIG. 9 is a flow diagram illustrating determination of the associated sites in accordance with the flow chart of FIG. 8.

Sites associated with a particular site in the displayed search results of the initial iteration may be displayed by a user as illustrated in FIGS. 8–9. Specifically, a user selects a particular displayed web site 45 at step 61 by preferably initiating (e.g., clicking on) the association link adjacent that web site via the end-user computer system mouse. In response to the selection, the server system accesses the association database at step 63 and retrieves web sites 49 (e.g., web sites one to L, where L is the number of associated sites and is generally greater than or equal to one) associated with the selected site. The associated sites are displayed with their corresponding links by the end-user computer system at step 65. For example, a search for "cars" initially provides a list of various automobile manufacturer web sites, while selecting a particular site facilitates display of the associated sites. This enables the search engine to provide additional relevant sites.

Figures 10, 11, 12:
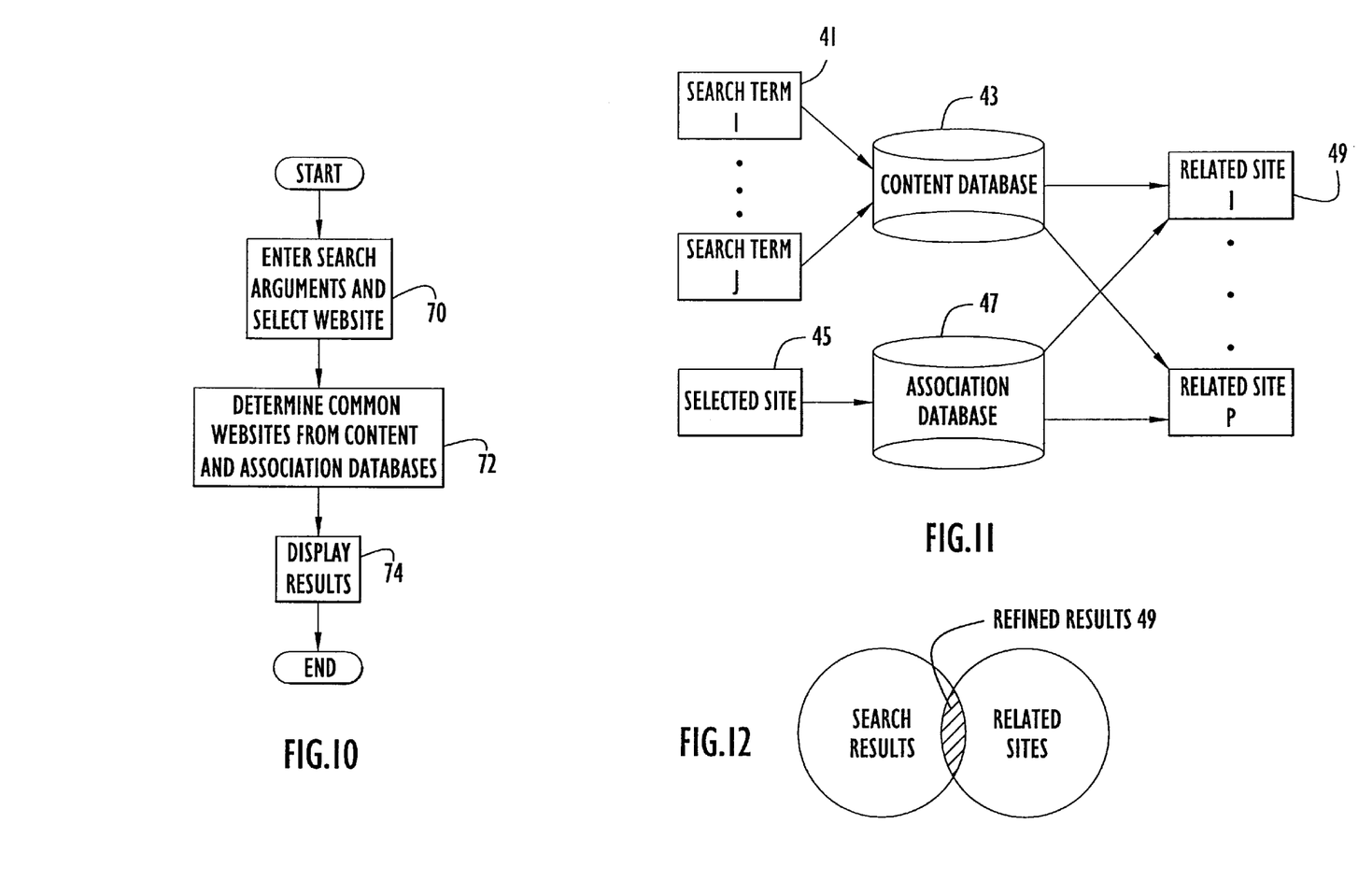
FIG. 10 is a procedural flow chart illustrating a manner in which search results may be refined by sites associated with a user selected site according to the present invention.
FIG. 11 is a flow diagram illustrating refinement of search results in accordance with the flow chart of FIG. 10.
FIG. 12 is an exemplary diagrammatic illustration of the manner in which refined search results are determined in accordance with the flow chart of FIG. 10.

Results from the initial iteration may be refined by associated sites of a selected web site to produce refined results as illustrated in FIGS. 10–12. Specifically, a search argument having search terms 41 (e.g., terms one to J, where J is the number of terms and is generally greater than or equal to one) is entered into the end-user computer system to perform the initial iteration and produce and display ranked results as described above. A user selects a displayed web site 45 at step 70 by preferably initiating (e.g., clicking on) the refinement link adjacent that web site via the end-user computer system mouse. In response to the selection, the server system determines associated sites from association database 47 and compares the associated sites with web sites retrieved from the content database satisfying the search argument at step 72. Web sites 49 (e.g., web sites one to P, where P is the number of common sites and is generally greater than or equal to one) common to each of the refined search results are displayed with their corresponding links at step 74, thereby providing further relevant sites. In other words, the refined results are web sites associated with the selected site and satisfying the search criteria. Thus, the refined results are essentially the intersection of the sets of search results obtained from the search argument and associated sites as diagrammatically illustrated by way of example only in FIG. 12.

Figure 13:
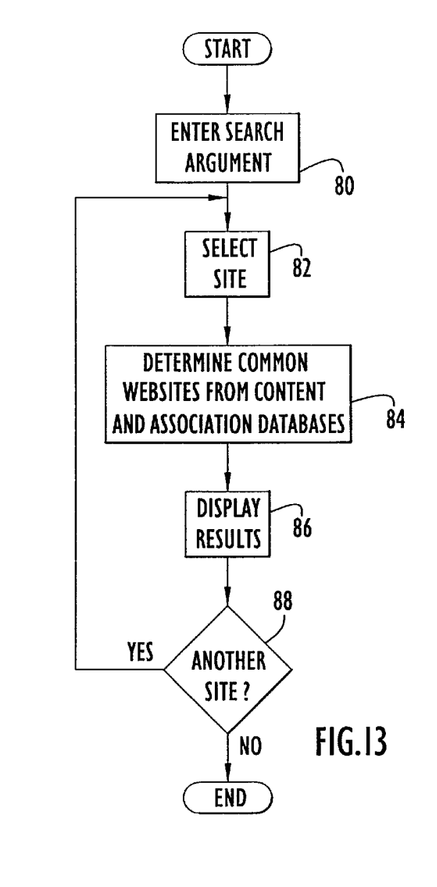
FIG. 13 is a procedural flow chart illustrating a manner in which search results may be refined by sites associated with plural user selected sites according to the present invention.
Figure 14:
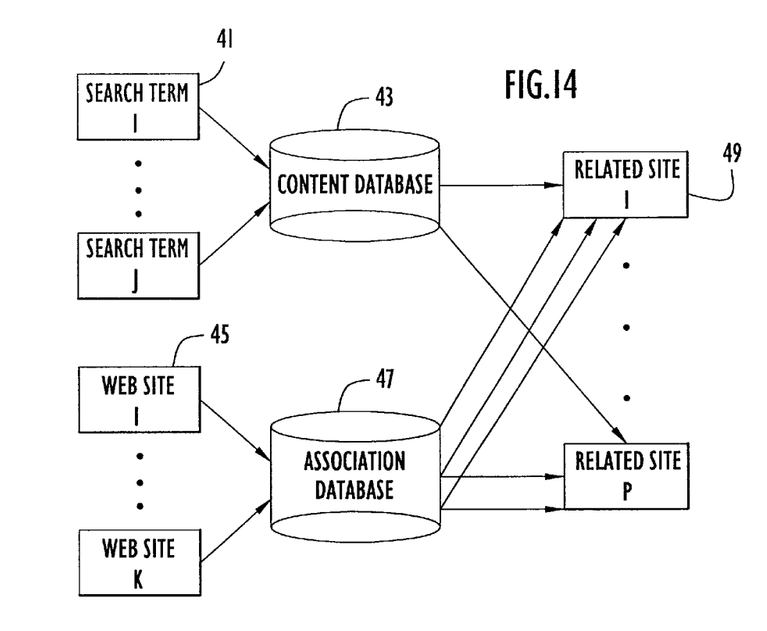
FIG. 14 is a flow diagram illustrating refinement of search results in accordance with the flow chart of FIG. 13.
Figure 15:
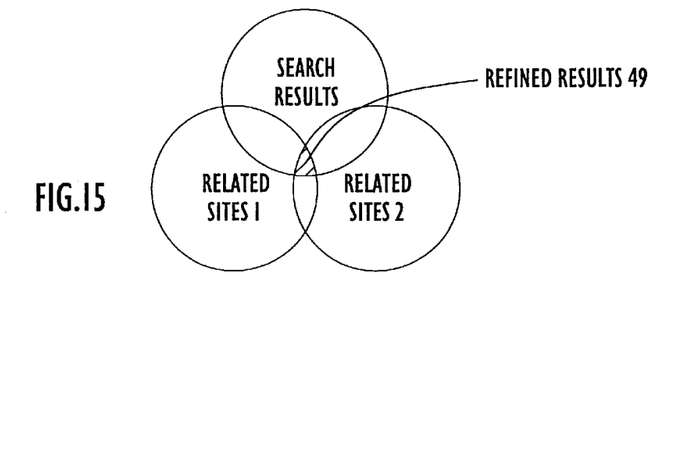
FIG. 15 is an exemplary diagrammatic illustration of the manner in which refined search results are determined in accordance with the flow chart of FIG. 13.

Plural web sites may be selected within initial and subsequent iterations to provide refined results as illustrated in FIGS. 13–15. In particular, a search argument having search terms 41 (e.g., terms one to J, where J is the number of terms and is generally greater than or equal to one) is entered into the end-user computer system at step 80 to perform the initial iteration and produce and display ranked results as described above. A user selects a displayed web site 45 at step 82 by preferably initiating (e.g., clicking on) the refinement link adjacent that web site via the end-user computer system mouse. In response to the selection, the server system determines the associated web sites for the selected site from the association database. Web sites 49 (e.g., web sites one to P, where P is the number of common sites and is generally greater than or equal to one) common to the results from the selected site and the search argument are determined at step 84. The common sites are displayed with their corresponding links at step 86 by the end-user computer system, where these results basically represent the intersection of the sets of search results obtained from the search argument and associated sites. The user may select a subsequent site 45 from the displayed refined search results by preferably initiating (e.g., clicking on) the refinement link adjacent that web site via the end-user computer system mouse. The associated sites for the selection are determined by the server system from association database 47 and sites common to the results from the search argument and each selected site are displayed with their corresponding links at step 86 by the end-user computer system. When additional sites are to be selected as determined at step 88, the above process is repeated; otherwise the process terminates. The above process may be repeated for any quantity of sites, where the final results represent the intersection of the results of the search argument and each selected site as illustrated, by way of example only for two selected sites, in FIG. 15.

Figure 16:
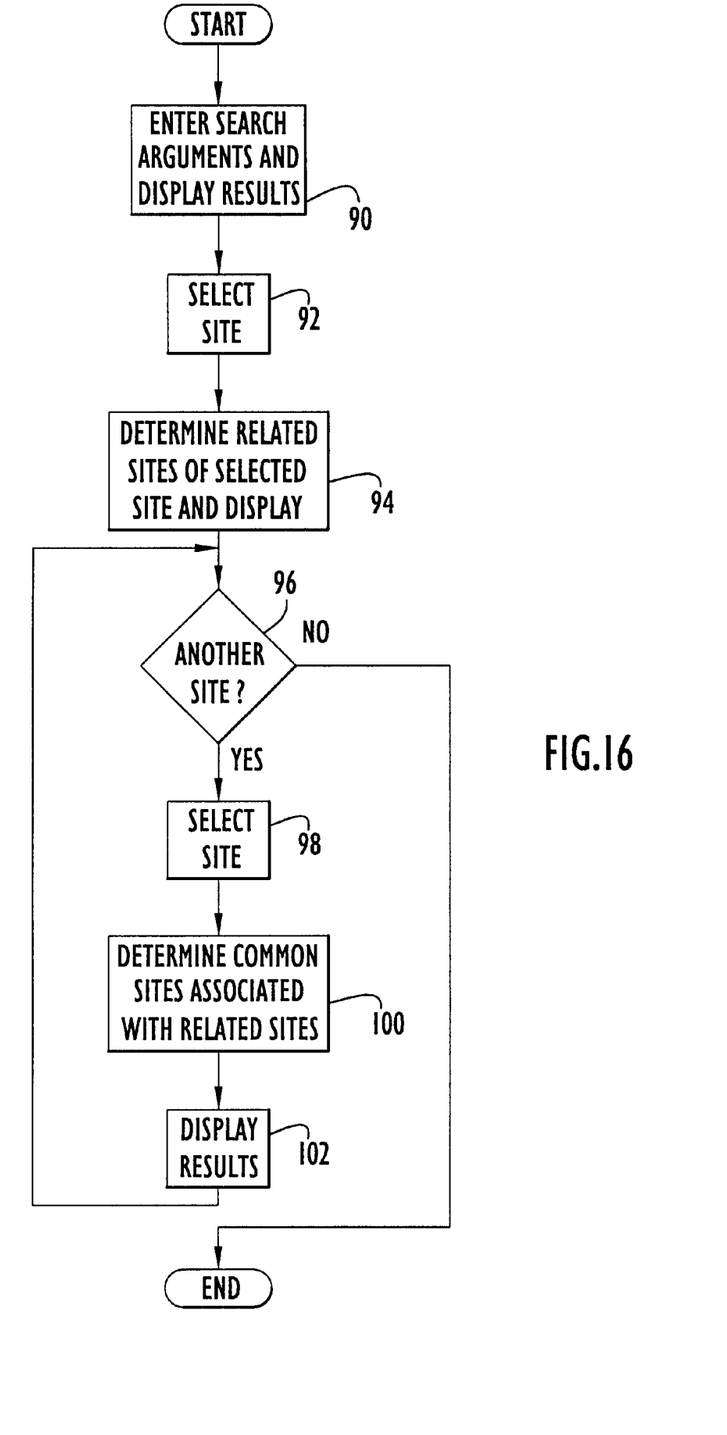
FIG. 16 is a procedural flow chart illustrating a manner in which search results based on associations with user selected sites may be combined according to the present invention.
Figure 17:
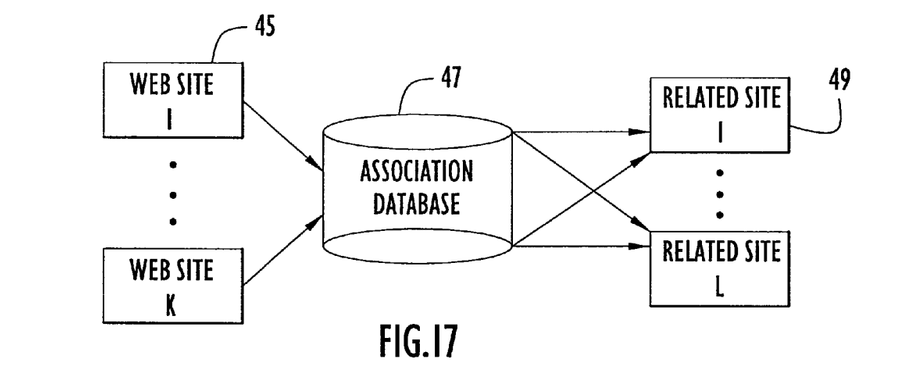
FIG. 17 is a flow diagram illustrating determination of search results in accordance with the flow chart of FIG. 16.
Figure 18:
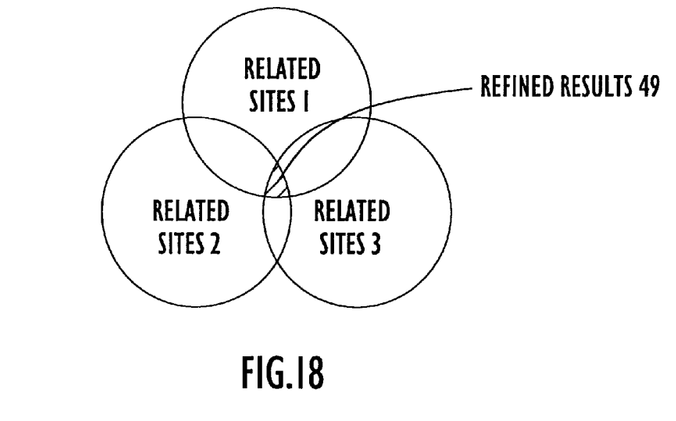
FIG. 18 is an exemplary diagrammatic illustration of the manner in which association search results are combined in accordance with the flow chart of FIG. 16.

In addition, associated web sites of a site may be selected in subsequent iterations to produce refined results as illustrated in FIGS. 16–18. Specifically, a search argument is initially entered into the end-user computer system to perform the initial iteration and produce and display ranked results at step 90 as described above. A user selects a displayed web site 45 at step 92 by preferably initiating (e.g., clicking on) the corresponding association link via the end-user computer system mouse. In response to the selection, the server system determines the associated web sites for the selected site from association database 47 and displays the determined sites with their corresponding links at step 94. A subsequent displayed associated web site 45 may be further selected as determined at step 96, where the corresponding refinement link for the selected site is initiated via the end-user computer system mouse at step 98 as described above. Sites 49 (e.g., site one to L, where L is the number of common sites and is generally greater than or equal to one) common to the associated sites of the initially and subsequently selected sites are determined at step 100 with the resulting sites being displayed with their corresponding links by the end-user computer system at step 102. When other sites are to be selected as determined at step 96 (e.g., selected sites one to K, where K is the number of selected sites and is generally greater than or equal to one), the above process is repeated; otherwise the process terminates. Thus, the refined results are essentially the intersection of the sets of associated sites for each selected site as illustrated, by way of example only for three selected sites, in FIG. 18.

Referring back to FIG. 5, if the displayed results are to be refined as determined at step 60, the user initiates the refinement and the server system produces the refined results at step 62 as described above. The refined results are displayed at the end-user computer system at step 64. The resulting web sites may be further refined by the user as determined at step 66. When refinement is not requested at step 60, or is completed as determined at step 66, a new search is determined at step 68. When a new search is desired, the above process is repeated by processing a newly entered search query; otherwise the process terminates.

It is to be understood that the software for the search engine of the present invention may be implemented in any desired computer language and could be developed by one of ordinary skill in the computer arts based on the functional descriptions contained in the specification and flow charts illustrated in the drawings. By way of example only, the search engine software may be implemented in the Perl or 'C++' computer languages.

It will be appreciated that the embodiments described above and illustrated in the drawings represent only a few of the many ways of implementing a network search engine and navigation tool and method of determining search results in accordance with search criteria and/or associated sites.

The end-user and server computer systems of the present invention may be implemented by any personal or other type of computer system (e.g., IBM-compatible, Apple, Macintosh, laptop, palm pilot, etc.). The computer systems of the present invention may include any commercially available operating system (e.g., Windows, OS/2, Unix, Linux, etc.). The computer systems of the present invention may further include any commercially available or custom software (e.g., server software, browser software, etc.), and any types of input devices (e.g., keyboard, mouse, voice recognition, etc.). It is to be understood that the software for the computer systems of the present invention may be implemented in any desired computer language and could be developed by one of ordinary skill in the computer arts based on the functional descriptions contained in the specification and flow charts illustrated in the drawings. The computer systems of the present invention may alternatively be implemented by hardware or other processing circuitry. The various functions of the computer systems may be distributed in any manner among any quantity of computer or processing systems or circuitry. The software and/or algorithms described above and illustrated in the flow charts may be modified in any manner that accomplishes the functions described herein.

The network may be implemented by any communications network (e.g., LAN, WAN, Internet, Intranet, etc.) and may be spidered by any conventional or other techniques. The server and end-user computer systems may include any conventional or other communications devices to communicate over the network. The content and association databases may be implemented by any quantity of conventional or other databases or storage structures (e.g., file, data structure, etc.), may be arranged in any fashion and may store any desired information. The association and content databases may be refreshed or updated at any desired intervals (e.g., hourly, daily, weekly, etc.). The association database may utilize any threshold values or schemes based on any stored data to remove data from the database.

The search engine of the present invention, including the accompanying databases, may be implemented by any quantity of computer systems, and may reside on the server, end-user or other third-party computer system or any combination of these computer systems. Moreover, the search engine may search information stored in any type of storage structure (e.g., files, databases, etc.), whereby the information may reside on a stand-alone system or any quantity of systems connected via any type of network (e.g., LAN, WAN, Internet, etc.). The search engine may be available on recorded medium (e.g., floppy diskettes, CD-ROM, memory devices, etc.) for use on stand-alone systems or systems connected by a network, or may be downloaded (e.g., in the form of carrier waves, packets, etc.) to systems from a network.

The information for the databases may be accumulated in any desired manner, and may utilize any quantity of spidering iterations. The links and pages may be associated by any type of identifier having any quantity of any type of alphanumeric or other characters or symbols. The relationship values may be determined in any manner and utilize any incrementing scheme or function to adjust scores based on link proximity, quantities of links, or any other criteria (e.g., pre-assigned values, random values, functions, etc.). Relationships may be inherited by any quantity of children, and child values may be determined from any type of function (e.g., percentage, algebraic function, etc.) of the parent value, or any other technique (e.g., pre-assigned values, random values, etc.).

The results and server or search engine web site may be displayed and arranged in any fashion and include any desired information. Each search result may include any quantity of links, buttons or other input symbols to initiate refinement or other processing of results. The results may be combined in any logical or other fashion (e.g., intersection, union, XOR, etc.) to produce refined results. Further, any quantity of refinement iterations may be initiated by the user.

The present invention is not limited to the specific applications disclosed herein, but may be utilized in substantially the same manner described above to search through any types of data or information having links, pointers or other indicators to other data related in any fashion. For example, the present invention may be utilized to search through data containing documents listing or citing other related documents by specific identification (e.g., case law, patents, various newspaper or other articles, etc.), whereby a search query may result in finding initial documents satisfying the query and other documents related to those initial documents.

From the foregoing description it will be appreciated that the invention makes available a novel network search engine and navigation tool and method of determining search results in accordance with search criteria and/or associated sites wherein a search engine produces search results in response to a request based on a search argument and associations within the search results. In addition, the search engine provides related information and facilitates refinement of search results to enhance relevancy.

Having described preferred embodiments of a new and improved network search engine and navigation tool and method of determining search results in accordance with search criteria and/or associated sites, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A network search system for ascertaining sites residing on a network and including desired information entered by a user, wherein said network sites include references identifying others of said network sites containing related information, said system comprising:

a site association module to analyze said references of said network sites and determine associations between said network sites indicating network sites containing related information;

a storage unit for storing information relating to contents of said network sites and said associations between said network sites;

a retrieval module for accessing said storage unit in response to said entered information and determining network sites containing said entered information; and an evaluation module to determine a score value for each determined network site based on information contained within that site and said associations of that site with said determined network sites and to arrange said determined network sites for display based on said determined scores.

2. The system of claim 1 wherein said network includes the internet and said network sites include web sites.

3. The system of claim 1 wherein said storage unit includes a content database for storing said information relating to contents of said network sites, and an association database for storing said information relating to associations between said network sites.

4. The system of claim 3 wherein said association database includes relationship values for associated network sites, wherein each relationship value indicates a strength of a relationship between corresponding associated network sites.

5. The system of claim 4 wherein said evaluation module includes a score module to determine score values for said determined network sites based on information contained within said determined network sites and to adjust said score values of said determined network sites in accordance with said relationship values, wherein said score module adjusts said score value of each determined network site by incrementing said score value by said corresponding relationship values between that site and said determined sites.

6. The system of claim 1 further including an association module to access said storage unit and determine network sites for display that are associated with a determined network site selected by said user.

7. The system of claim 6 further including a refinement module to refine said determined sites associated with said user selected site based on network sites associated with additional sites selected by said user, wherein said refined sites include network sites common to sites associated with each said user selected site.

8. The system of claim 1 further including a refinement module to refine said determined network sites based on network sites associated with user selected sites, wherein said refined sites include network sites common to said determined network sites and said sites associated with said user selected sites.

9. The system of claim 1 wherein said references include links between said network sites.

10. The system of claim 1 wherein said site association module includes an association determination module to determine an association between network sites based on at least one of a presence and location of references to those sites on a common network site.

11. A program product apparatus having a computer readable medium with computer program logic recorded thereon for facilitating a network search system for ascertaining sites residing on a network and including desired information entered by a user, wherein said network sites include references identifying others of said network sites containing related information, said program product apparatus comprising:

a site association module to analyze said references of said network sites and determine associations between said network sites indicating network sites containing related information;

a storage module for storing information relating to contents of said network sites and said associations between said network sites;

a retrieval module for accessing said storage module in response to said entered information and determining network sites containing said entered information; and an evaluation module to determine a score value for each determined network site based on information contained within that site and said associations of that site with said determined network sites and to arrange said determined network sites for display based on said determined scores.

12. The apparatus of claim 11 wherein said storage module includes relationship values for associated network sites, wherein each relationship value indicates a strength of a relationship between corresponding associated network sites.

13. The apparatus of claim 12 wherein said evaluation module includes a score module to determine score values for said determined network sites based on information contained within said determined network sites and to adjust said score values of said determined network sites in accordance with said relationship values, wherein said score module adjusts said score value of each determined network site by incrementing said score value by said corresponding relationship values between that site and said determined sites.

14. The apparatus of claim 11 further including an association module to access said storage unit and determine network sites for display that are associated with a determined network site selected by said user.

15. The apparatus of claim 14 further including a refinement module to refine said determined sites associated with said user selected site based on network sites associated with additional sites selected by said user, wherein said refined sites include network sites common to sites associated with each said user selected site.

16. The apparatus of claim 11 further including a refinement module to refine said determined network sites based on network sites associated with user selected sites, wherein said refined sites include network sites common to said determined network sites and said sites associated with said user selected sites.

17. The apparatus of claim 11 wherein said references include links between said network sites.

18. The apparatus of claim 11 wherein said site association module includes an association determination module to determine an association between network sites based on at least one of a presence and location of references to those sites on a common network site.

19. A method of ascertaining sites residing on a network and including desired information entered by a user, wherein said network sites include references identifying others of said network sites containing related information, said method comprising the steps of:
   (a) analyzing said references of said network sites to determine associations between said network sites indicating network sites containing related information and storing information relating to contents of said network sites and said associations between said network sites in a storage unit;
   (b) accessing said storage unit in response to said entered information and determining network sites containing said entered information;
   (c) determining a score value for each determined network site based on information contained within that site and said associations of that site with said determined network sites; and
   (d) arranging said determined network sites for display based on said determined scores.

20. The method of claim 19 wherein said network includes the internet and said network sites include web sites.

21. The method of claim 19 wherein said storage unit includes a content database and an association database, and step (a) further includes:
   (a.1) storing said information relating to contents of said network sites in said content database; and
   (a.2) storing said information relating to associations between said network sites in said association database.

22. The method of claim 21 wherein step (a.2) further includes:
   (a.2.1) storing relationship values for associated network sites in said association database, wherein each relationship value indicates a strength of a relationship between corresponding associated network sites.

23. The method of claim 22 wherein step (c) further includes (c.1) determining score values for said determined network sites based on information contained within said determined network sites; and
   (c.2) adjusting said score value of each determined network site by incrementing said score value by said corresponding relationship values between that site and said determined sites.

24. The method of claim 19 further including the step of:
   (e) accessing said storage unit and determining network sites for display that are associated with a determined network site selected by said user.

25. The method of claim 24 further including the step of:
   (f) refining said determined sites associated with said user selected site based on network sites associated with additional sites selected by said user, wherein said refined sites include network sites common to sites associated with each said user selected site.

26. The method of claim 19 further including the step of:
   (e) refining said determined network sites based on network sites associated with user selected sites, wherein said refined sites include network sites common to said determined network sites and said sites associated with said user selected sites.

27. The method of claim 19 wherein said references include links between said network sites.

28. The method of claim 19 wherein step (a) further includes:
   (a.1) determining an association between network sites based on at least one of a presence and location of references to those sites on a common network site.

29. A search system for ascertaining data items stored within a storage device and including desired information entered by a user, wherein said data items include references identifying others of said data items containing related information, said system comprising:
   an item association module to analyze said references of said data items and determine associations between said data items indicating data items containing related information;
   a storage unit for storing information relating to contents of said data items and said associations between said data items;
   a retrieval module for accessing said storage unit in response to said entered information and determining data items containing said entered information; and
   an evaluation module to determine a score value for each determined data item based on information contained within that data item and said associations of that data item with said determined data items and to arrange said determined data items for display based on said determined scores.

30. The system of claim 29 further including an association module to access said storage unit and determine data items for display that are associated with a determined data item selected by said user.

31. The system of claim 30 further including a refinement module to refine said determined items associated with said user selected item based on data items associated with additional items selected by said user, wherein said refined items include data items common to items associated with each said user selected item.

32. The system of claim 29 further including a refinement module to refine said determined data items based on data items associated with user selected items, wherein said refined items include data items common to said determined data items and said items associated with said user selected items.

33. The system of claim 29 wherein said references include links between said data items.

34. A method of ascertaining data items stored within a storage device and including desired information entered by a user, wherein said data items include references identifying others of said data items containing related information, said method comprising the steps of:
(a) analyzing said references of said data items to determine associations between said data items indicating data items containing related information and storing information relating to contents of said data items and said associations between said data items in a storage unit;
(b) accessing said storage unit in response to said entered information and determining data items containing said entered information;
(c) determining a score value for each determined data item based on information contained within that item and said associations of that item with said determined data items; and
(d) arranging said determined data items for display based on said determined scores.

35. The method of claim 34 further including the step of:
(e) accessing said storage unit and determining data items for display that are associated with a determined data item selected by said user.

36. The method of claim 35 further including the step of:
(f) refining said determined items associated with said user selected item based on data items associated with additional items selected by said user, wherein said refined items include data items common to items associated with each said user selected item.

37. The method of claim 34 further including the step of:
(e) refining said determined data items based on data items associated with user selected items, wherein said refined items include data items common to said determined data items and said items associated with said user selected items.

38. The method of claim 34 wherein said references include links between said data items.

* * * * *